United States Patent [19]
Rha et al.

[11] Patent Number: 5,365,571
[45] Date of Patent: Nov. 15, 1994

[54] CELLULAR SYSTEM HAVING FREQUENCY PLAN AND CELL LAYOUT WITH REDUCED CO-CHANNEL INTERFERENCE

[75] Inventors: Peter S. Rha, Chevy Chase; Stanley E. Kay, Rockville; Andrew J. MacDonald, Damascus, all of Md.

[73] Assignee: Hughes Aircraft Company, Los Angeles, Calif.

[21] Appl. No.: 64,997

[22] Filed: May 24, 1993

[51] Int. Cl.⁵ .................. H04M 11/00; H04Q 7/00
[52] U.S. Cl. .................................. 379/59; 455/33.1
[58] Field of Search .............. 379/59, 60; 455/33.1, 455/33.2, 34.1, 25, 56.1, 33.3

[56] References Cited

U.S. PATENT DOCUMENTS 5,073,971 12/1991 Schaeffer .......................... 455/33.1
5,247,699 9/1993 Hartman ........................... 455/33.1

OTHER PUBLICATIONS

Mouly, Michel. "Regular cellular reuse patterns", 41st IEEE Vehicular Technology Conference. Gateway to the Future Technology in Motion (Cat No. 91CH2944-7) pp. 681-8, 1991.

*Primary Examiner*—Curtis Kuntz
*Assistant Examiner*—Michael B. Chernoff
*Attorney, Agent, or Firm*—Gordon R. Lindeen, III; William J. Streeter; Wanda K. Denson-Low

[57] ABSTRACT

A cellular radio-telephone system has a plurality of cells each of which has S sectors. The cells are grouped into a plurality of clusters each of which has N adjoining cells. Each cell has a set of assigned system frequencies with respective frequency subsets assigned to its sectors so that N groups of co-channel cells exist with each co-channel cell group including one cell from each cluster having channel frequencies corresponding to those for its co-channel cell group. Respective base station antennas are located in the respective sectors of the respective cells, and each of the cell sectors has a plurality of subscriber station directional antennas disposed at predetermined locations within the sector for communication linkage with the associated base station antenna. The cells are generally formed in rows and columns and further are formed to provide a predetermined relative orientation pattern for co-channel cell sectors. Co-channel cells form a first cell tier around a preselected center co-channel cell with a common direction operative as a reference orientation direction for co-channel sectors therein. Co-channel sectors in successive co-channel cells about the first tier being successively oriented in alternating first and second directions with sectors rotated by at least one sector rotation from the reference direction in the clockwise or counterclockwise direction.

17 Claims, 9 Drawing Sheets

CELLULAR SYSTEM HAVING FREQUENCY PLAN AND CELL LAYOUT WITH REDUCED CO-CHANNEL INTERFERENCE

BACKGROUND OF THE INVENTION

The present invention relates to cellular radio-telephone systems and more particularly to reduction of co-channel interference in fixed and other cellular radio-telephone systems.

In designing a cellular system layout, a land area is divided into cells each of which corresponds to an area most likely to be serviced by a base station transmitter within that area. A frequency plan assigns the system-allocated frequencies to the various cells in the system layout.

In the frequency plan, frequency reuse is normally employed to achieve a system call capacity significantly greater than the total number of allocated channel frequencies. In applying frequency reuse, a carrier frequency is commonly assigned to different system cells which are separated sufficiently from each other to achieve relatively low interference between radio channels in different cells having the same frequency, i.e., low co-channel interference. Directional base station antennas are normally used in the system cells to achieve further reduction in co-channel interference.

In mobile cellular systems, subscriber unit antennas are normally omni-directional because of the mobility of the subscriber units. Generally, co-channel interference has been found to be minimized in mobile cellular systems when the directional antennas of cells having common frequency assignments are oriented in the same direction.

In a fixed cellular system, or in a cellular system having "fixed" and mobile subscriber units, the "fixed" subscriber units are fixed in location and may be shared by multiple subscribers. For example, all of the occupants of a building might share the use of a subscriber unit disposed in a fixed location in the building. Fixed cellular systems are especially applicable to developing countries and rural areas in developed countries where inadequate wireline capacity exists to provide common wire telephone service. Thus, fixed cellular systems offer an opportunity to achieve quality telephone service quickly without the high capital costs of wire installation. Cellular systems also may have a mix of fixed and mobile subscriber units.

It is desirable that fixed and other cellular systems be provided with frequency plans that are more effective than the conventional frequency plans of the prior art.

SUMMARY OF THE INVENTION

The present invention is accordingly directed to a cellular system having reduced co-channel interference thereby enabling higher quality communication and/or higher system capacity.

A cellular radio-telephone system comprises a plurality of cells adjoining each other within a predetermined land area. The cells each commonly have a predetermined number of sectors and are grouped into clusters of N adjacent cells. Each cell cluster has a set of assigned system frequencies.

Each cell within each cell cluster has a subset of frequencies from the frequency set so that N groups of co-channel cells exist with each co-channel cell group including one cell from each cluster having channel frequencies corresponding to those for its co-channel cell group. Each sector within each cell has channels corresponding to a sub-subset of frequencies from the associated frequency subset.

Respective base station antennas are located in the respective sectors of the respective cells. Each of the cell sectors has a plurality of subscriber directional antennas disposed at predetermined locations within the sector for communication linkage with the associated base station antenna.

In one aspect of the invention, co-channel cells form a first cell tier around a preselected center co-channel cell with a common direction operative as a reference orientation direction for co-channel sectors therein. Co-channel sectors in successive co-channel cells about the first tier are successively oriented in alternating first and second directions. The alternating directions are a first direction corresponding to at least one sector rotation from the reference direction in the counter-clockwise direction and a second direction corresponding to at least one sector rotation from the reference direction in the clockwise direction.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DESCRIPTION OF THE INVENTION

Figure 1:
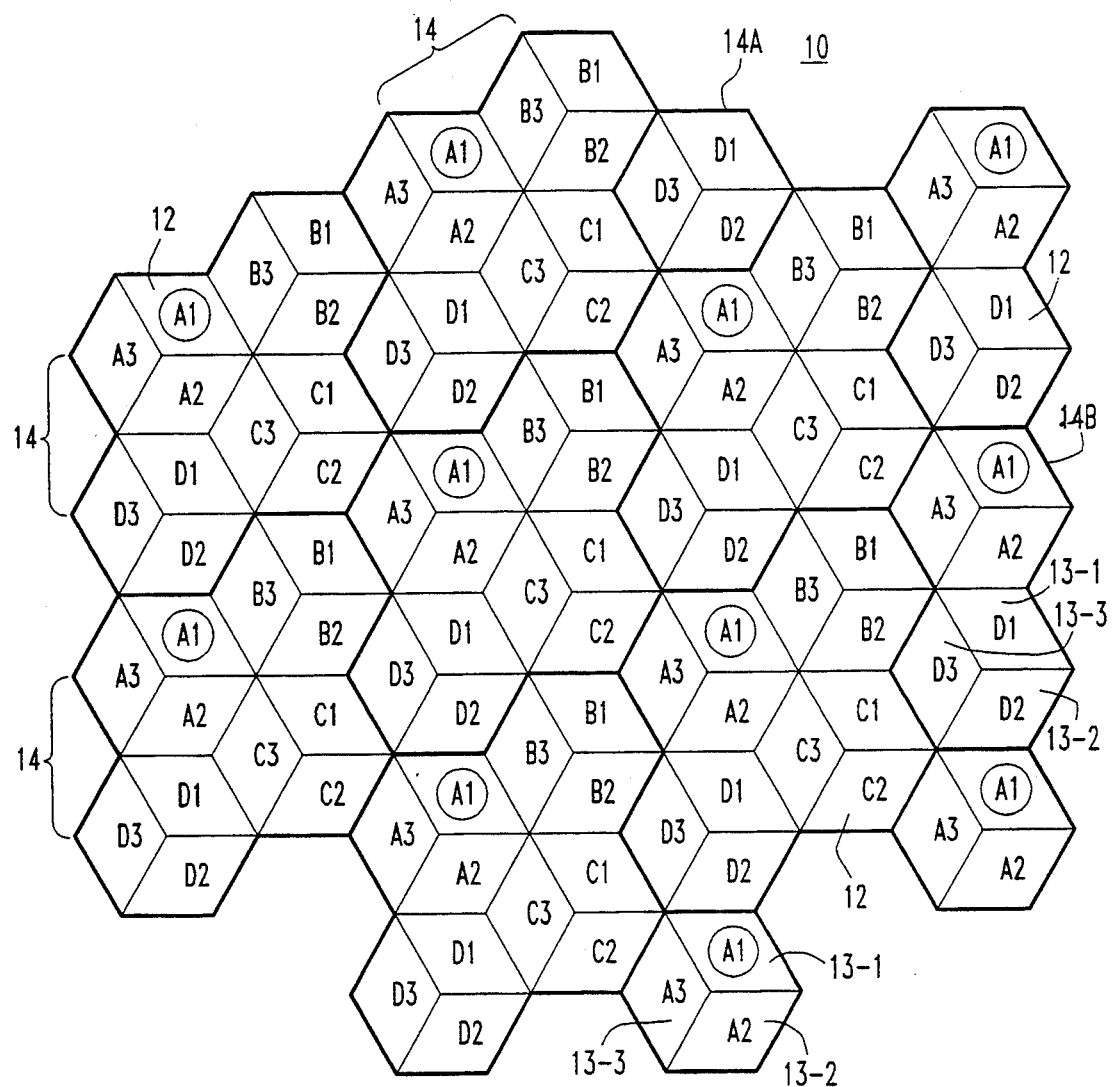
FIGS. 1, 2A and 2B are schematic diagrams that illustrate prior art frequency reuse patterns having 120 degree or 60 degree sectors for use in a cellular system.

In FIG. 1, a cell layout 10 for a conventional mobile cellular radio-telephone system is structured in accordance with a frequency plan under which a plurality of cells 12 are grouped into 4-cell clusters 14. N is defined to be the number of cells in a cell cluster. Thus, N=4 in the cell layout 10. Some clusters, such as 14A and 14B, are incomplete because of their location near the system boundary.

The cells 12 are commonly represented by identical hexagons as conventionally practiced in the pertaining art. In this manner, the cellular system can be visualized more easily.

The frequency allocation for the cellular system is divided into channels, and all of the allocated channel frequencies are divided among the four cells in each cell cluster 14. Frequency reuse thus occurs in each cell cluster 14.

Specifically, the allocated frequencies are divided into channel frequency sets A, B, C, and D which are respectively assigned to the four cells in each cluster. Since each cell 12 is structured with 120 degree base station sectors 13-1, 13-2, 13-3, the frequency sets A, B, C, and D are further subdivided into respective frequency subsets A1–A3, B1–B3, C1–C3, and D1–D3 in correspondence to the three sectors.

Figure 3:
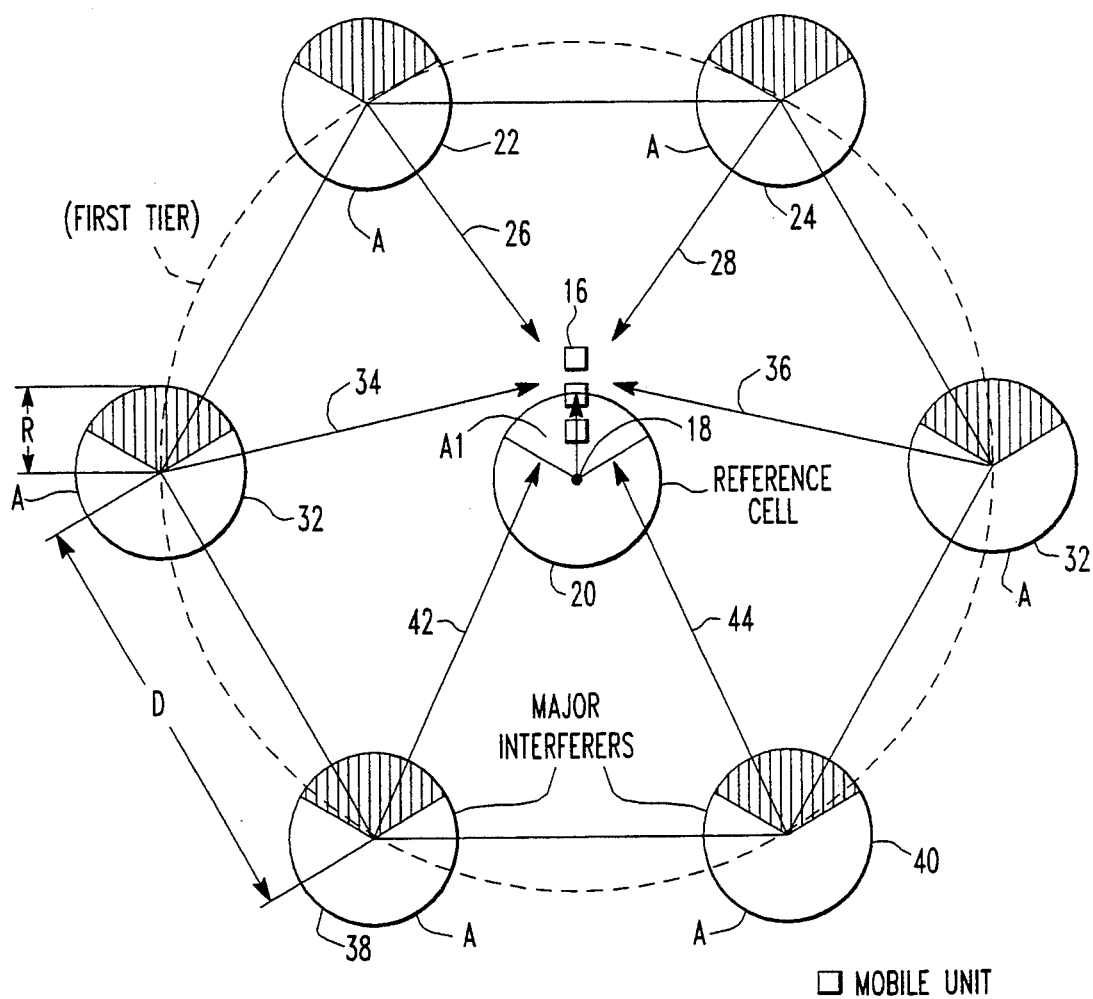
FIG. 3 is a schematic diagram illustrating sources of co-channel interference in a conventional cellular system having 120 degree directional base station antennas.

The frequency reuse pattern just described is illustrated with enlarged detail in FIG. 3. In this instance, cells are approximated by circles because only selected frequency-reuse cells A are shown. The distance between cells A is D and the radius of each cell is R. In real systems, the distance D and the radius R would differ for different cells. However, the distance D and the radius R are basic system design factors that affect the signal-to-interference ratio for co-channels.

In FIG. 3, a mobile unit 15 is communicating through a base station antenna 18 in the A1 sector of an A cell 20. Conventionally, co-channel interference is minimized when like sectors of like cells are oriented in the same direction as shown by the shaded sectors in FIG. 3.

Thus, as shown in FIG. 3, co-channel interference for the mobile unit 16 originates from back lobes of cells 22 and 24 as indicated by reference characters 26 and 28, from side lobes of cells 30 and 32 as indicated by reference characters 34 and 36, and from main lobes of cells 38 and 40 as indicated by reference characters 42 and 44. Although "major" main lobe interference exists in the pattern of FIG. 3, overall co-channel interference is minimized.

Figure 2A:
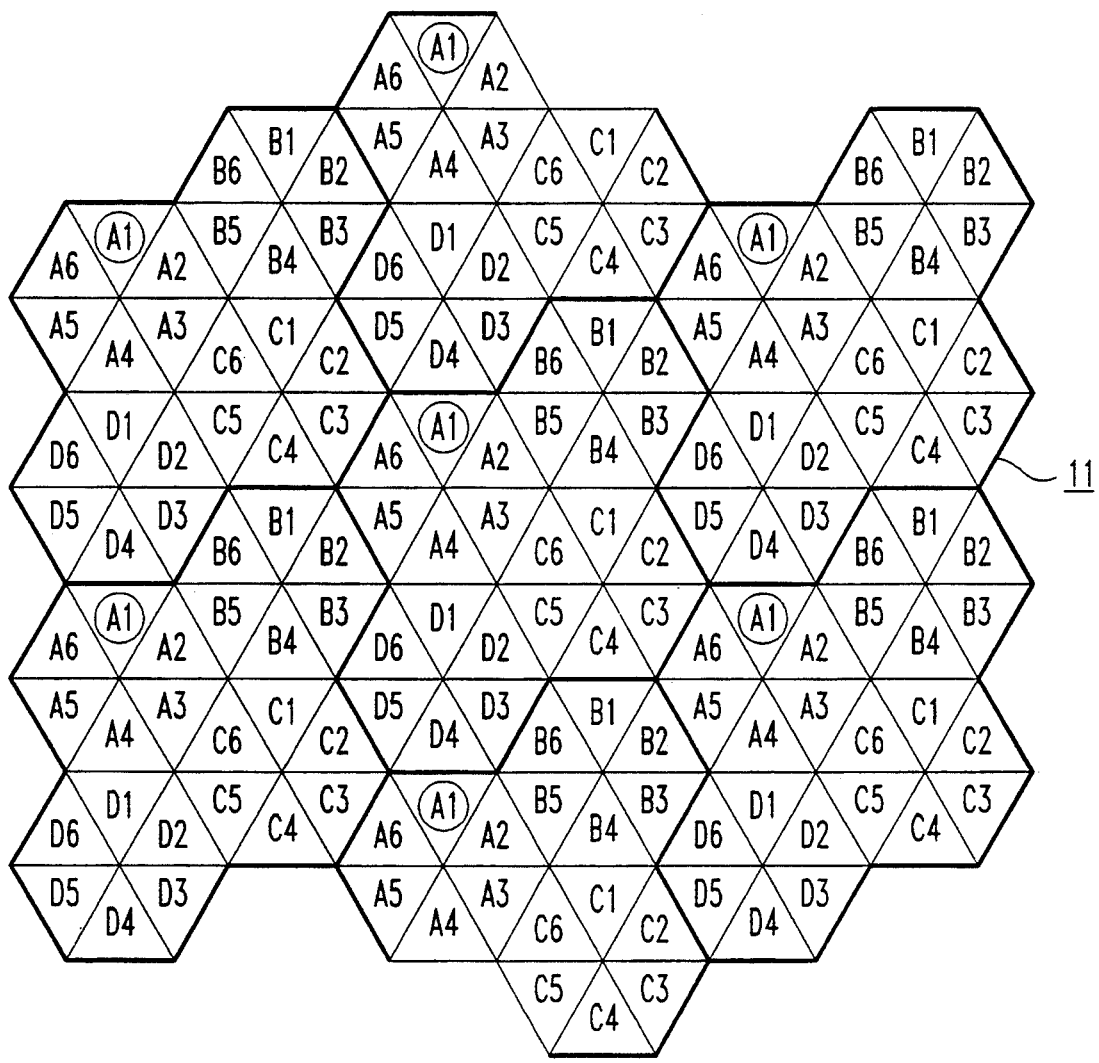

Another conventional cell layout 11 is shown in FIG. 2A. In this case, N is again equal to four, but each cell is divided into six 60 degree sectors because of the use of 60 degree sector antennas. However, a mobile cellular system having the layout 11 operates with minimum co-channel interference essentially as described for the 120 degree sector system of FIGS. 1 and 3.

Figure 2B:
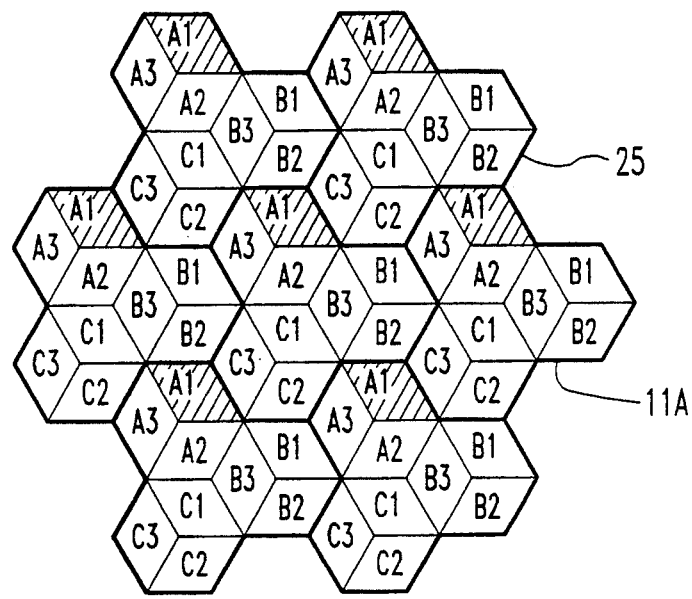

FIG. 2B shows still another conventional cell layout 11A in which N=3 and the number of sectors S=3 as a result of each sector being a 120° sector.

Figure 4:
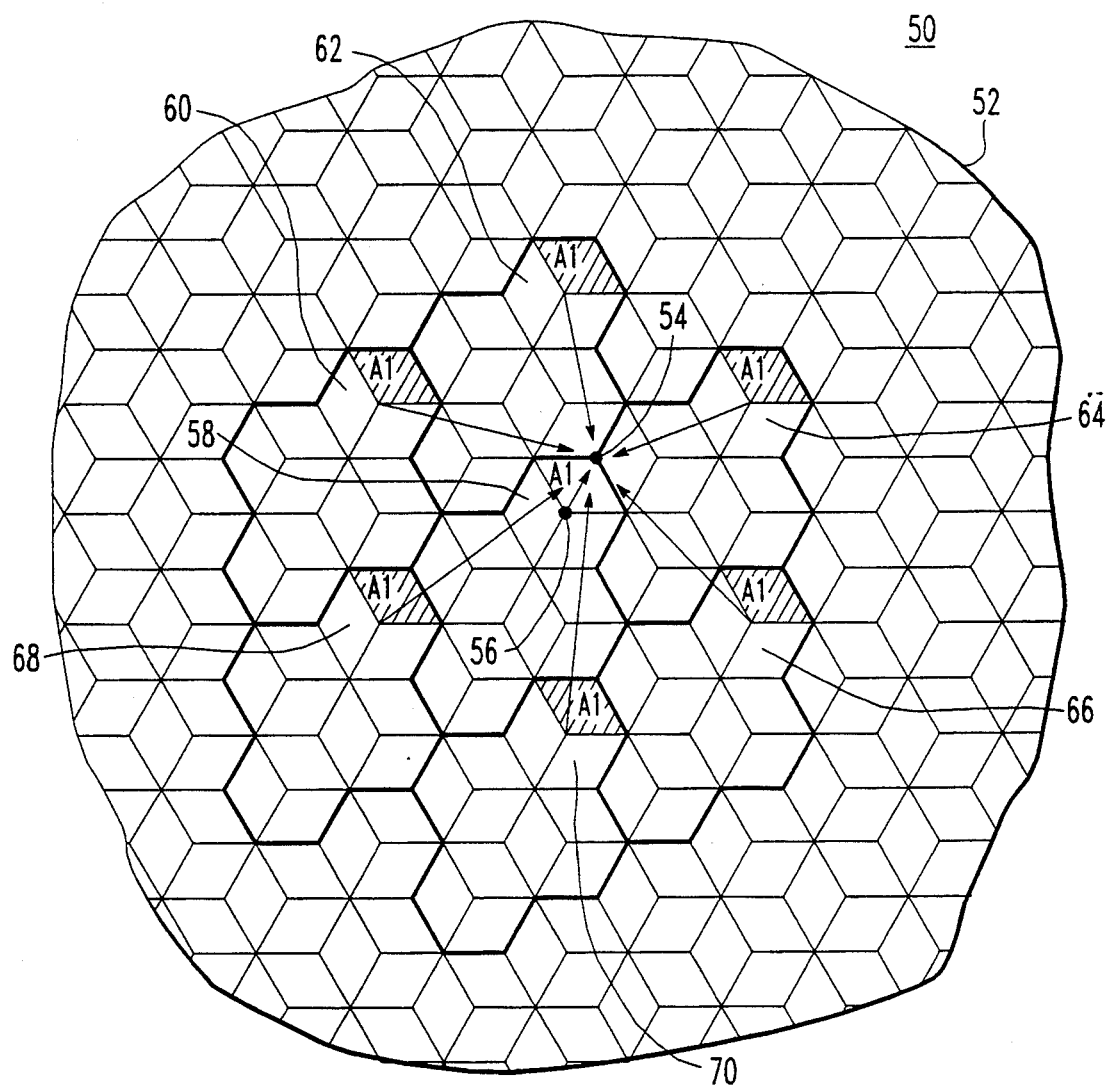
FIG. 4 illustrates a fixed cellular system having a cell layout with a conventional frequency plan and having fixed subscriber units or stations with omni-directional antennas.

In FIG. 4, a fixed cellular system 50 is provided with a conventional frequency plan and cell layout 52 similar to the cell layout 10 of FIG. 1. In this case, a fixed subscriber station (SS) 54, having an omni-directional antenna, is communicating through a base station (BS) antenna 56 in a 120 degree A1 sector of a cell 58. For reasons all previously described, co-channel cells 60, 62, 64, and 66 in a first cell tier provide only minor co-channel interference. However, co-channel cells 68 and 70 are "major" interferers as previously described.

More particularly, the SS 54 receives the desired signal from its host base station (BS) 54 and co-channel interference from co-channels cells in the first cell tier and subsequent cell tiers located further away. As shown, the first cell tier generates the principal co-channel interference, and there are six co-channel cells in the first cell tier that surrounds the cell 58 in the center. The 120 degree directional antennas in the co-channel cells are aligned as previously described and thus are pointed in such a way that there are only two co-channel cells that illuminate or interfere with the SS 54. It is assumed that the BS directional antennas are ideal and the effects of the propagation anomaly due to the environment is negligible.

Figure 5A:
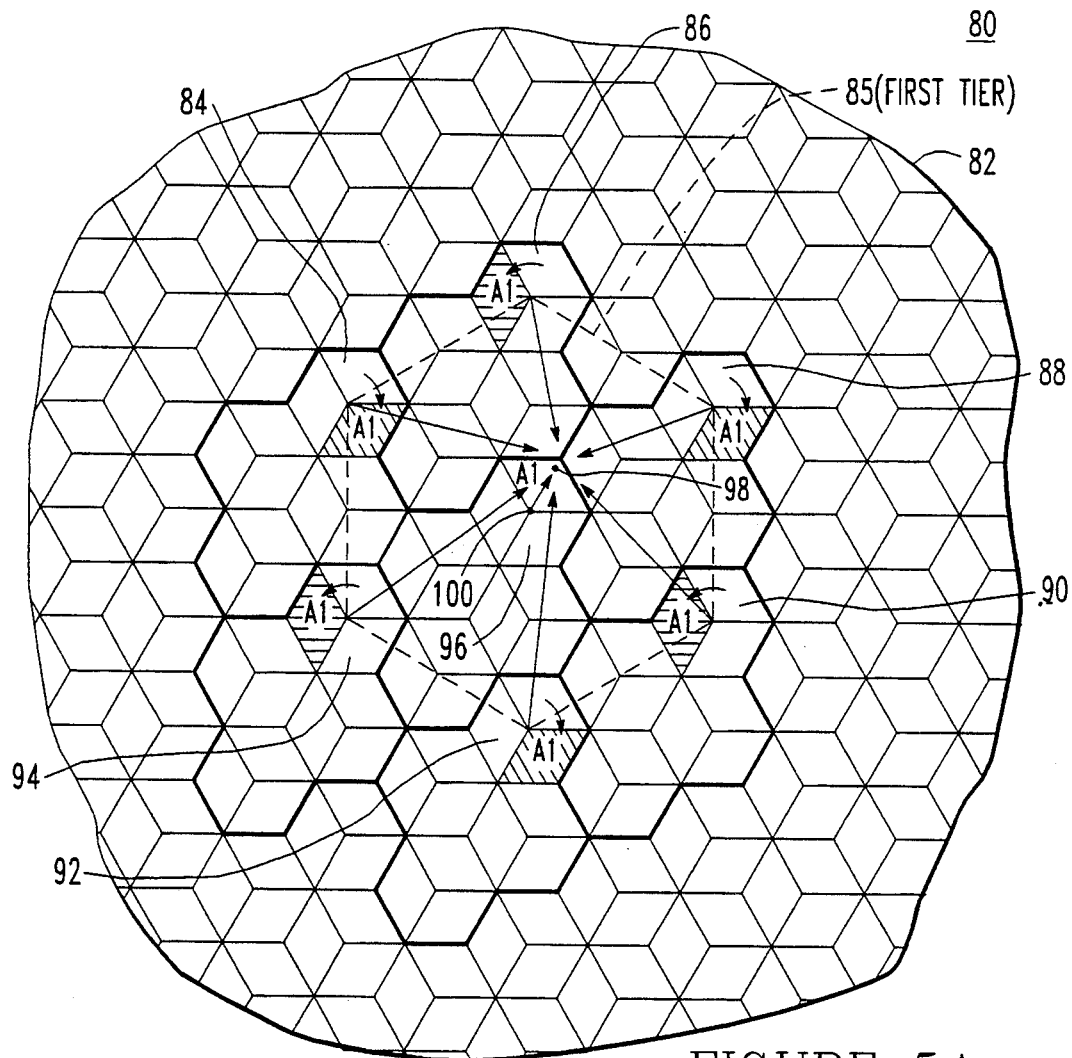
FIGS. 5A and 5B illustrate a cellular system, i.e. a fixed cellular system, arranged in accordance with the principles of the present invention.
Figure 5B:
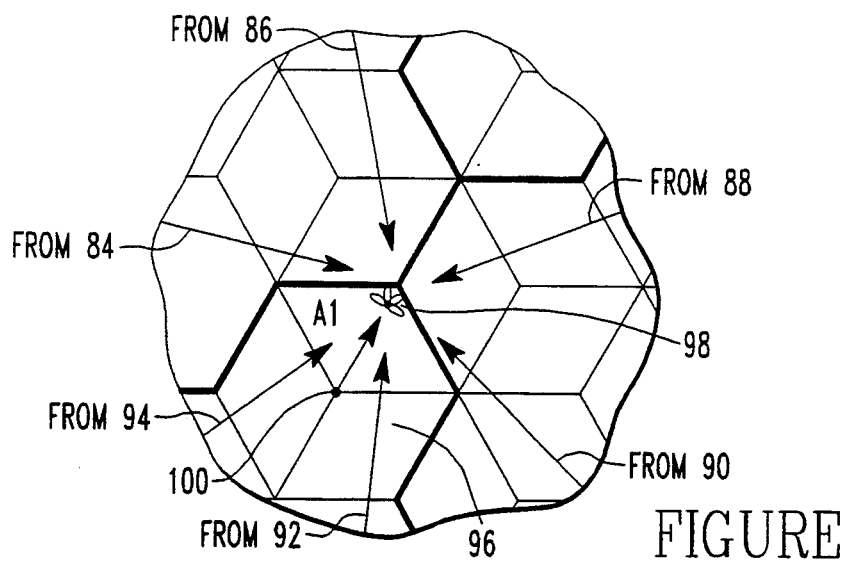

A fixed cellular system 80 is arranged in accordance with the present invention to provide reduced co-channel interference as shown in FIG. 5 and, with enlargement in FIG. 5A. A cell layout 82 again includes six co-channel cells 84, 86, 88, 90, 92, and 94 in a cell tier 85 surrounding a cell 96 in which communication is occurring between a subscriber station (SS) antenna 98 and a base station (BS) antenna 100. In other applications of the invention, a cellular system may include fixed and mobile subscriber units, or only mobile subscriber units.

The SS antenna 8 is a directional antenna which provides relatively little reduction in the co-channel interference as compared to the case of the omni-directional antenna of FIG. 4. Little interference reduction is achieved because the two major interfering cells 92 and 94 are still within the main beam of the SS antenna 98. The exact amount of limited co-channel interference reduction depends on the narrowness of the SS antenna beam width.

Figure 6:
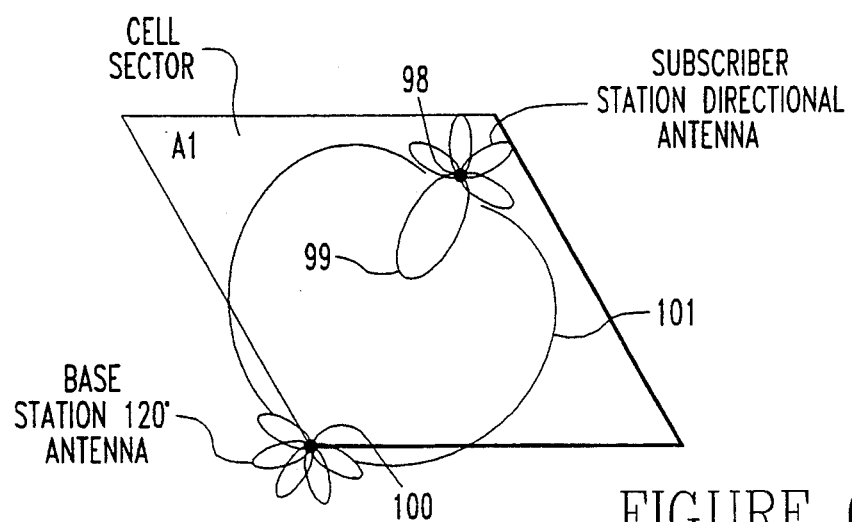
FIG. 6 is an enlarged schematic that illustrates directional base and subscriber station antennas in a single cell of the system of FIG. 5.

A further enlarged schematic is shown in FIG. 6 to illustrate the operation of the directional SS antenna 98 and the 120 degree sector BS antenna 100. Directivity occurs through respective main lobes 99 and 101. A suitable BS antenna is a 820–960 MHz, wideband, 120 degree sector antenna supplied by Radio Frequency Systems. A suitable directive antenna is a 806–960 MHz, Yagi antenna, PD10108 available from the same supplier.

To take advantage of the directivity of SS antennas in reducing co-channel interference, an improved frequency plan is provided for a cell layout 110 as shown in FIG. 5. In the cell layout 82, N again equals 4, 120° sectors are employed for the cells, and co-channel sectors of co-channel cells are designated by shading. The frequency assignment within each three-sector cell is modified from the conventional alignment orientation by rotating each cell to reduce co-channel interference on the basis of the directional orientation of the SS antenna.

The sectors in each cell are rotated either clockwise or counter clockwise, in this case, by one sector so that none of the six interferer cells in the first tier 85 are in the main beam of the SS antenna 98. Sector rotation from normal aligned positions in FIG. 5 is designated by small arrows. In other cases, such as where S=6, the cell sectors may be rotated 1 or more sectors to minimize co-channel interference.

Figure 7:
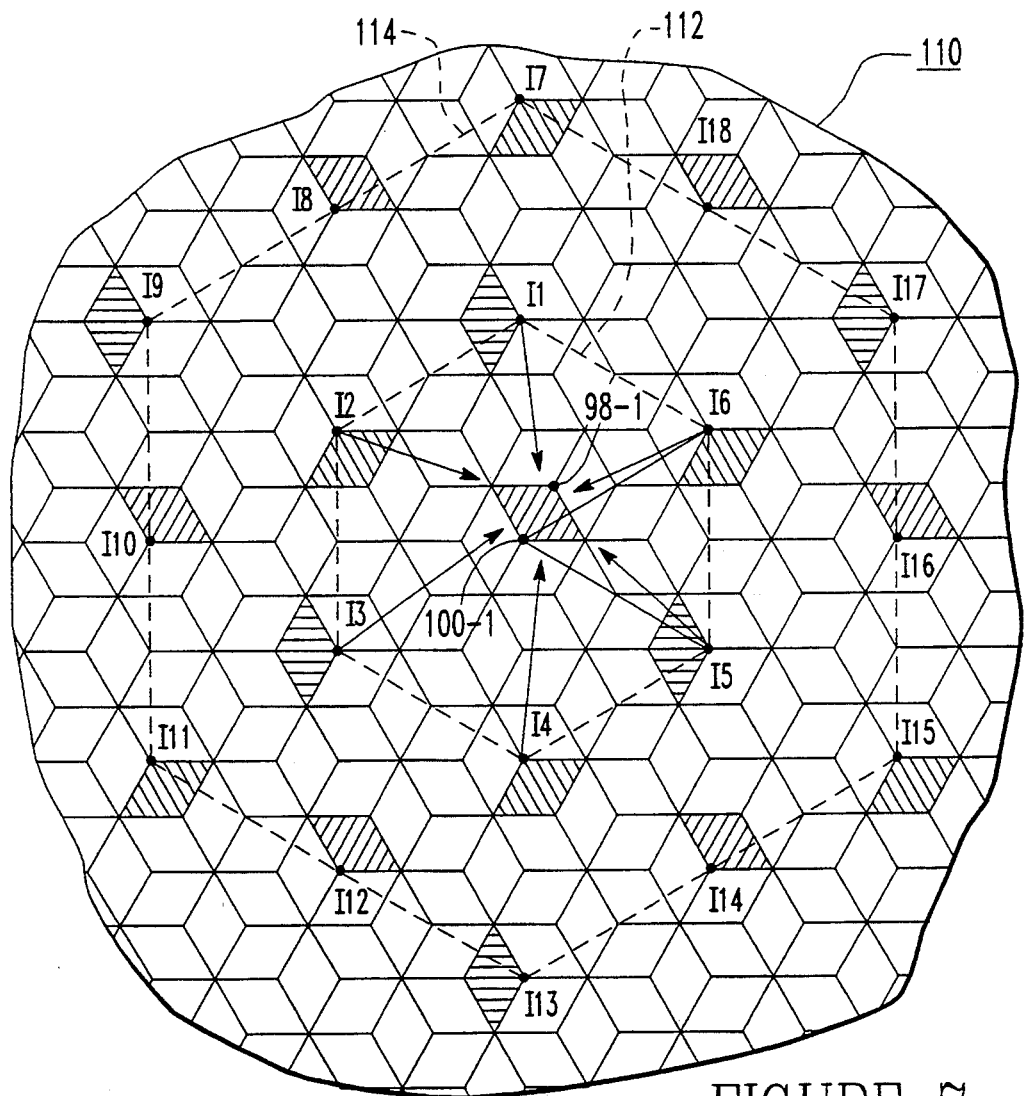
FIG. 7 shows the fixed cellular system of FIG. 5 with an additional tier of co-channel cells being indicated.

In FIG. 7, a second cell tier 114 of co-channel cells is shown along with a first tier 112 in another cell layout 10 of the invention. Although co-channel interference from second and higher tier cells is normally relatively insignificant, such interference is even further reduced by the invention for reasons like those described for the first tier 85 in FIG. 5 or the first tier 112 in FIG. 7.

An overall cell sector pattern results from orientation of co-channel cells in accordance with the invention as described above. Thus, from a row/column perspective, for N=4 co-channel cell sectors in each row are commonly aligned, and the co-channel sectors in adjacent rows are rotated by one sector. In cell columns, successive co-channel cell sectors are rotated by one sector, and commonly oriented co-channel cell sectors in adjacent columns are offset by two intervening cell rows.

The overall pattern just described applies to layouts having cell clusters having N=4. Similar characteristic patterning results when N=7 or other values.

From a tier standpoint, successive co-channel cells about the periphery of each tier have co-channel cell sectors that are successively rotated by one sector. The orientation of co-channel cell sectors in successive tiers is such that cells in different tiers but in common rows are commonly oriented.

The cell layout 110 has a signal-to-interference ratio that is much better (higher) than that obtainable in cell layouts using conventional frequency plans. The amount of improvement varies depending on the location of SS antennas, but overall the invention provides much better results than those provided by conventional systems.

Figure 8:
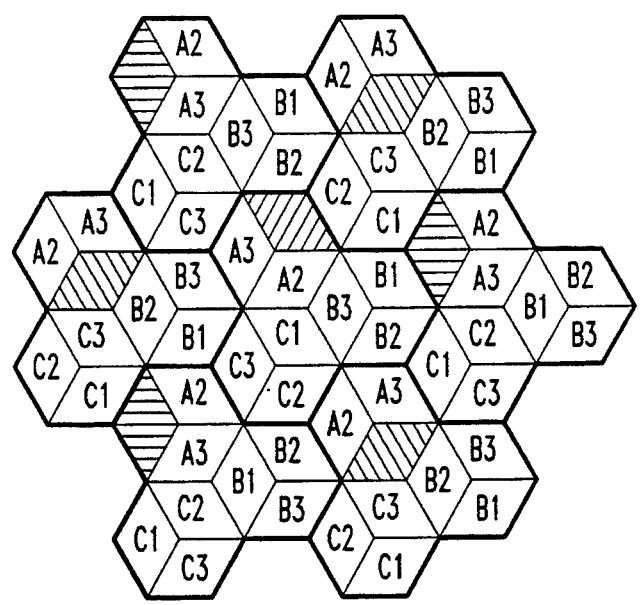
FIG. 8 shows a fixed cellular system with cell sectors rotated in accordance with the invention for a frequency plan having N=3 with 120° sectors.
Figure 9:
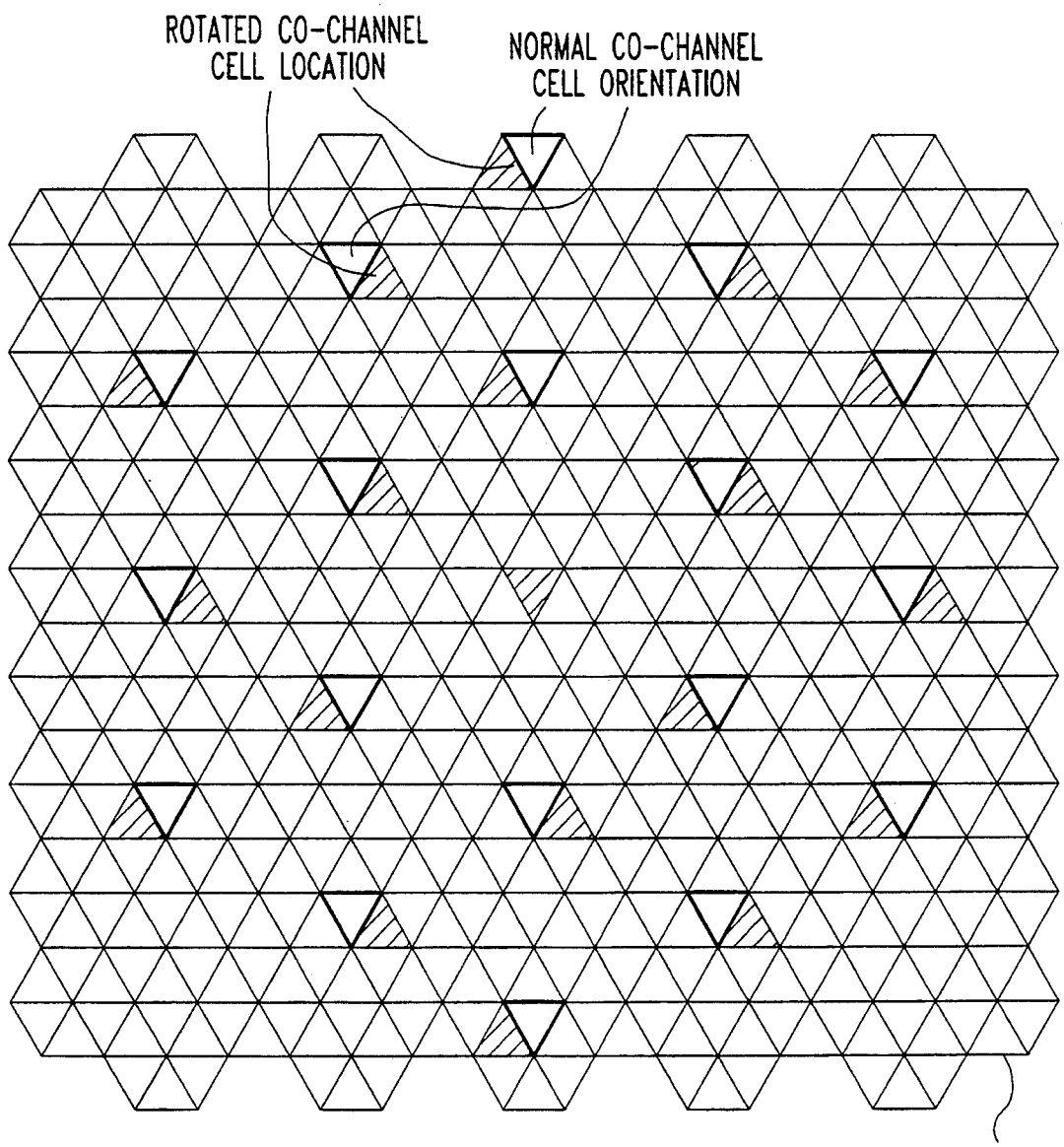
FIGS. 9 and 10 show a fixed cellular system having a frequency plan of N=4 with 60° sectors and respectively having one-sector rotations and two-sector rotations in accordance with the invention.
Figure 10:
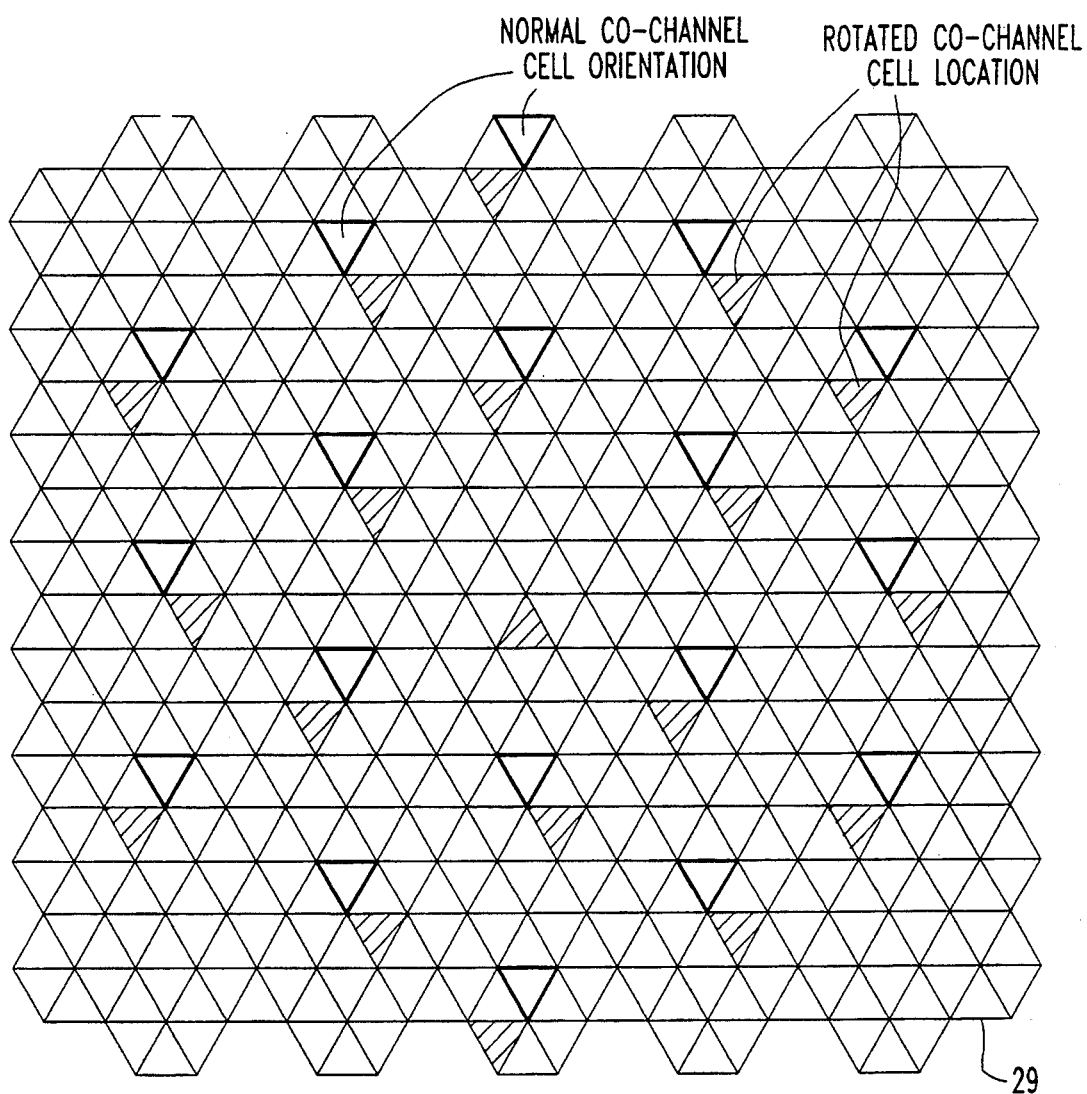

Additional embodiments of the invention are shown in FIGS. 8–10. Thus, in FIG. 8, there is shown a system cell pattern 25 with N=3 and S=3 and with co-channel cells rotated by one sector.

System cell patterns 27 and 29 of the invention in FIGS. 9 and 10 have N=4 and S=6 with co-channel cells being rotated by one sector in the system 27 and by two sectors in the system 29.

The foregoing description of the preferred embodiment has been presented to illustrate the invention. It is not intended to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A cellular radio-telephone system comprising:
   a first plurality of cells located adjacent to each other within a predetermined land area;
   the cells each commonly having a second plurality of sectors;
   the cells being grouped into clusters of N adjoining cells where N equals at least 2;
   each cell cluster having a set of assigned system frequencies;
   each cell within each cell cluster having a subset of frequencies from the frequency set so that N groups of co-channel cells exist with each co-channel cell group including one cell from each cluster having channel frequencies corresponding to those for its co-channel cell group;
   each sector within each cell having channels corresponding to a sub-subset of frequencies from the associated frequency subset;
   respective base station antennas located in the respective sectors of the respective cells;
   each of the cell sectors having a third plurality of subscriber station directional antennas disposed at predetermined locations within the sector for communication linkage with the associated base station antenna;
   the cells being disposed substantially in rows and columns and further being formed to provide a predetermined relative orientation pattern for co-channel cell sectors;
   co-channel cells forming a first cell tier around a preselected center co-channel cell with a common direction operative as a reference orientation direction for co-channel sectors therein;
   co-channel sectors in successive co-channel cells about the first tier being successively oriented in alternating first and second directions; and
   the alternating directions being a first direction corresponding to at least one sector rotation from the reference direction in the counter-clockwise direction and a second direction corresponding to at least one sector rotation from the reference direction in the clockwise direction.

2. The cellular system of claim 1 wherein additional co-channel cells form a second tier around the preselected center co-channel cell, and co-channel sectors in successive co-channel cells about the second tier are oriented in the manner defined for the first tier co-channel cells.

3. The cellular system of claim 1 wherein the sector rotations are each at least two sectors.

4. The cellular system of claim 1 wherein N=3 and each channel sector is a 120° sector.

5. The cellular system of claim 1 wherein N=3 and each channel sector is a 60° sector.

6. The cellular system of claim 1 wherein N=4 and each channel sector is a 60° sector.

7. The cellular system of claim 1 wherein N=4 and each channel sector is a 120° sector.

8. The cellular system of claim 3 wherein N=3 and each channel sector is a 60° sector.

9. The cellular system of claim 2 wherein N=3 and each channel sector is a 120° sector.

10. The cellular system of claim 3 wherein N=4 and each channel sector is a 60° sector.

11. The cellular system of claim 2 wherein N=4 and each channel sector is a 120° sector.

12. The cellular system of claim 1 wherein the system is a fixed system and the third plurality of subscriber station directional antennas in each cell are disposed at predetermined fixed locations therein.

13. A cellular radio-telephone system comprising:
   a first plurality of cells located adjacent to each other within a predetermined land area;
   the cells each commonly having a second plurality of sectors;
   the cells being grouped into clusters of N adjoining cells where N equals at least two;
   each cell cluster having a set of assigned system frequencies;
   each cell within each cell cluster having a subset of frequencies from the frequency set so that N groups of co-channel cells exist with each co-channel cell group including one cell from each cluster having channel frequencies corresponding to those for its co-channel cell group;
   each sector within each cell having channels corresponding to a sub-subset of frequencies from the associated frequency subset;
   respective base station antennas located in the respective sectors of the respective cells;
   each of the cell sectors having a third plurality of subscriber station directional antennas disposed at predetermined locations within the sector for communication linkage with the associated base station antenna;
   the cells being distributed in a predetermined pattern over the predetermined land area; and
   the respective orientation directions of co-channel cells being selected to minimize co-channel interference on the basis of the directional orientation of the subscriber station directional antennas.

14. The cellular system of claim 13 wherein N=3 and each channel sector is a 60° sector.

15. The cellular system of claim 13 wherein N=3 and each channel sector is a 120° sector.

16. The cellular system of claim 13 wherein N=4 and each channel sector is a 60° sector.

17. The cellular system of claim 13 wherein N=4 and each channel sector is a 120° sector.

* * * * *